US010523011B2

(12) United States Patent
Yu et al.

(10) Patent No.: US 10,523,011 B2
(45) Date of Patent: Dec. 31, 2019

(54) VOLTAGE COMPENSATION APPARATUS FOR PHOTOVOLTAIC SYSTEM AND PHOTOVOLTAIC SYSTEM

(71) Applicant: SUNGROW POWER SUPPLY CO., LTD., Hefei, Anhui (CN)

(72) Inventors: Yanfei Yu, Anhui (CN); Hua Ni, Anhui (CN); Zongjun Yang, Anhui (CN); Shangfang Dai, Anhui (CN)

(73) Assignee: SUNGROW POWER SUPPLY CO., LTD., Hefei, Anhui (CN)

( * ) Notice: Subject to any disclaimer, the term of this patent is extended or adjusted under 35 U.S.C. 154(b) by 277 days.

(21) Appl. No.: 15/444,976

(22) Filed: Feb. 28, 2017

(65) Prior Publication Data
US 2017/0279278 A1 Sep. 28, 2017

(30) Foreign Application Priority Data
Mar. 23, 2016 (CN) .......................... 2016 1 0178811

(51) Int. Cl.
*H02J 3/38* (2006.01)
*H02M 7/44* (2006.01)
(52) U.S. Cl.
CPC ............... *H02J 3/383* (2013.01); *H02M 7/44* (2013.01)
(58) Field of Classification Search
None
See application file for complete search history.

(56) References Cited

U.S. PATENT DOCUMENTS 9,287,712 B2 3/2016 Borup et al.
9,627,973 B2* 4/2017 Shibata ............... H03K 17/163
(Continued)

FOREIGN PATENT DOCUMENTS

CN 103607172 A 2/2014
CN 103944502 A 7/2014
(Continued)

OTHER PUBLICATIONS

SIPO of People's Republic of China First Office Action corresponding to Application No. 201610178811.X; dated May 8, 2017.
(Continued)

*Primary Examiner* — Jared Fureman
*Assistant Examiner* — Joel Barnett
(74) *Attorney, Agent, or Firm* — Cantor Colburn LLP

(57) ABSTRACT

A voltage compensation apparatus for a photovoltaic system and a photovoltaic system are provided. The voltage compensation apparatus includes a current direction limiting circuit and a compensation power supply connected in series; or only includes a current direction limiting circuit. The current direction limiting circuit includes at least one limiting device configured to conduct a current in a unidirectional manner. The voltage compensation apparatus is connected between the output terminal of the converter and the ground. The photovoltaic system includes: a photovoltaic array, a converter, a transformer and the voltage compensation apparatus. An output terminal of the converter is connected with a primary side of the transformer, and an input terminal of the converter is connected with the photovoltaic array. The voltage compensation apparatus is configured to raise or lower a voltage at the output terminal of the converter.

18 Claims, 9 Drawing Sheets

(56) References Cited

U.S. PATENT DOCUMENTS

| | | | |
|---|---|---|---|
| 2004/0211459 A1* | 10/2004 | Suenaga | H01L 31/02021 136/244 |
| 2010/0282293 A1 | 11/2010 | Meyer et al. | |
| 2011/0273017 A1* | 11/2011 | Borup | H02J 3/383 307/63 |
| 2013/0027992 A1* | 1/2013 | Bucker | H02J 3/26 363/34 |
| 2013/0187464 A1* | 7/2013 | Smith | H02S 30/20 307/47 |
| 2015/0013744 A1 | 1/2015 | Kim et al. | |
| 2016/0028325 A1 | 6/2016 | Redmann | |
| 2017/0104334 A1* | 4/2017 | Premerlani | H02J 3/18 |

FOREIGN PATENT DOCUMENTS

| | | |
|---|---|---|
| CN | 103973217 A | 8/2014 |
| CN | 104201715 A | 12/2014 |
| CN | 104901618 A | 9/2015 |
| DE | 102014217657 A1 | 4/2015 |
| EP | 2364522 A | 5/2010 |
| EP | 2977848 A1 | 1/2016 |
| JP | 2015092829 A | 5/2015 |

OTHER PUBLICATIONS

Extended European Search Report for corresponding Application No. 17158106.9-1804; dated Aug. 25, 2017.

* cited by examiner

VOLTAGE COMPENSATION APPARATUS FOR PHOTOVOLTAIC SYSTEM AND PHOTOVOLTAIC SYSTEM

CROSS REFERENCE TO RELATED APPLICATION

The present application claims the priority to Chinese Patent Application No. 201610178811.X, titled "VOLTAGE COMPENSATION APPARATUS FOR PHOTOVOLTAIC SYSTEM AND PHOTOVOLTAIC SYSTEM", filed on Mar. 23, 2016 with the State Intellectual Property Office of People's Republic of China, which is incorporated herein by reference in its entirety.

TECHNICAL FIELD

The present disclosure relates to the field of photovoltaic technology, and in particular to a voltage compensation apparatus for a photovoltaic system and a photovoltaic system.

BACKGROUND

The potential induced degradation (PID) refers to an output characteristic degradation of certain types of PV panels due to potential induction under a specific voltage relative to the ground. The PID effect will result in a decreased output power of the photovoltaic system.

Therefore, in order to prevent or reduce the PID effect, it is necessary to compensate the voltage of the photovoltaic system relative to the ground, so that bias voltages of the photovoltaic panels relative to the ground are in a range free of the PID effect.

In the conventional art, a voltage compensation apparatus is added on a direct current side of the photovoltaic system. For the photovoltaic system with multiple PV inverters connected in parallel on the alternating current side of the photovoltaic system, the direct side of each of the photovoltaic inverters needs to be added with one such apparatus, resulting in high cost. In addition, a circulating current may exist between the multiple voltage compensation apparatuses, affecting the reliability of the photovoltaic system.

Therefore, it is desired in the field to provide a voltage compensation apparatus for a photovoltaic system which can prevent or reduce the PID effect of photovoltaic panels.

SUMMARY

In order to solve the PID effect of photovoltaic panels in the conventional art, the present disclosure provides a voltage compensation apparatus for a photovoltaic system and a photovoltaic system, which can prevent or reduce the PID effect of the photovoltaic panels.

Embodiments of the present disclosure provide a voltage compensation apparatus for a photovoltaic system which is applied to a photovoltaic system, the photovoltaic system includes: a photovoltaic array, a converter and a transformer; where an output terminal of the converter is connected with a primary side of the transformer, an input terminal of the converter is connected with the photovoltaic array.

The voltage compensation apparatus includes: a current direction limiting circuit;

where the current direction limiting circuit includes at least one limiting device configured to conduct a current in a unidirectional manner; and the voltage compensation apparatus is connected between the output terminal of the converter and the ground.

Preferably, the voltage compensation apparatus further includes a compensation power supply connected in series with the current direction limiting circuit, the voltage compensation apparatus includes one current direction limiting circuit and one compensation power supply connected in series, in a case that the photovoltaic system is a single-phase system;

at least one phase is connected with the voltage compensation apparatus in a case that the photovoltaic system is a three-phase system;

the voltage compensation apparatus includes one current direction limiting circuit and one compensation power supply connected in series, in a case that one phase is connected with the voltage compensation apparatus;

the voltage compensation apparatus includes two current direction limiting circuits and one compensation power supply shared by the two current direction limiting circuits or includes two current direction limiting circuits and two corresponding compensation power supplies, in a case that two phases are connected with the voltage compensation apparatus;

the voltage compensation apparatus includes three current direction limiting circuits and one compensation power supply shared by the three current direction limiting circuits or includes three current direction limiting circuits and three compensation power supplies, in a case that three phases are connected with the voltage compensation apparatus.

Preferably, the voltage compensation apparatus further includes a current limiting circuit connected in series with the current direction limiting circuit; and the current direction limiting circuit includes at least one of a resistor and an inductor.

Preferably, the current direction limiting circuit is any one of:

a diode, a body diode of a Metallic Oxide Semiconductor Field Effect Transistor (MOSFET), an anti-parallel diode of an Insulated Gate Bipolar Transistor (IGBT), a thyristor and a zener diode.

Preferably, the voltage compensation apparatus further includes a voltage stabilizing circuit.

The voltage stabilizing circuit is connected in parallel with the current direction limiting circuit; or the voltage stabilizing circuit is connected in parallel with the series branch of the current direction limiting circuit and the compensation power supply.

Preferably, the voltage stabilizing circuit includes a capacitor.

Preferably, in a case that the current direction limiting circuit is a diode, an anode of the diode is connected with a phase power line, and a cathode of the diode is connected with the compensation power supply; or a cathode of the diode is connected with a phase power line, and an anode of the diode is connected with the compensation power supply.

Preferably, in a case that the photovoltaic system is a three-phase system having three phases connected with two voltage compensation apparatuses: a first voltage compensation apparatus including a first set of current direction limiting circuits and a second voltage compensation apparatus including a second set of current direction limiting circuits, the first set of current direction limiting circuits includes three first diodes, and each of the first diodes has an anode connected with a corresponding phase power line, and a cathode connected with the compensation power supply; and the second set of current direction limiting circuits includes three second diodes, and each of the second diode has a cathode connected with a corresponding phase power line, and an anode connected with the compensation power supply.

Preferably, in a case that the current limiting circuit is in a form of resistor, the current limiting circuit includes a first current limiting resistor and a second current limiting resistor.

The first set of current direction limiting circuits is connected with the compensation power supply through the first current limiting resistor; and the second set of current direction limiting circuits is connected with the compensation power supply through the second current limiting resistor.

Preferably, the voltage compensation apparatus further includes a surge protection circuit.

The surge protection circuit is connected in series with the current direction limiting circuit; or the surge protection circuit is connected between the output terminal of the converter and an input terminal of the transformer.

The present disclosure further provides a photovoltaic system, including: a photovoltaic array, a converter, a transformer and the described voltage compensation apparatus.

An output terminal of the converter is connected with a primary side of the transformer, an input terminal of the converter is connected with the photovoltaic array; and the voltage compensation apparatus is configured to raise or lower a voltage at the output terminal of the converter.

The present disclosure has at least the following advantages over the conventional art.

The output terminal of the converter is connected with the compensation power supply through the limiting device which conducts a current in a unidirectional manner. The limiting device only allows the current in the allowed direction, and do not allow current in the opposite direction. Thus with the limiting device, the lowest or highest value of the output voltage of the converter can be clamped to the voltage of the compensation power supply or be clamped to the ground. The present disclosure effectively utilizes the clamping function of the limiting device which conducts a current in a unidirectional manner, so as to raise or lower the output voltage of the converter to compensate the voltage of the photovoltaic system relative to the ground, which can prevent the PID effect.

BRIEF DESCRIPTION OF THE DRAWINGS

The accompany drawings used in the description of the embodiments or the conventional technology will be described briefly as follows, so that the technical solutions according to the embodiments of the present disclosure or the conventional technology will become more apparent. It is clear that the accompany drawings in the following description are only some embodiments of the present disclosure. For those skilled in the art, other drawings may be obtained according to these accompany drawings without any creative work.

DETAILED DESCRIPTION OF THE EMBODIMENTS

For a better understanding of the present disclosure by those skilled in the art, the technical solutions according to the embodiments of the present disclosure will be described with details in conjunction with the drawings. It is clear that the disclosed embodiments are a few of embodiments of the present disclosure, rather than all of the embodiments. Other embodiments obtained by those skilled in the art based on the embodiments of the present disclosure without creative work, fall into the scope of the present disclosure.

First Embodiment

Figure 1:
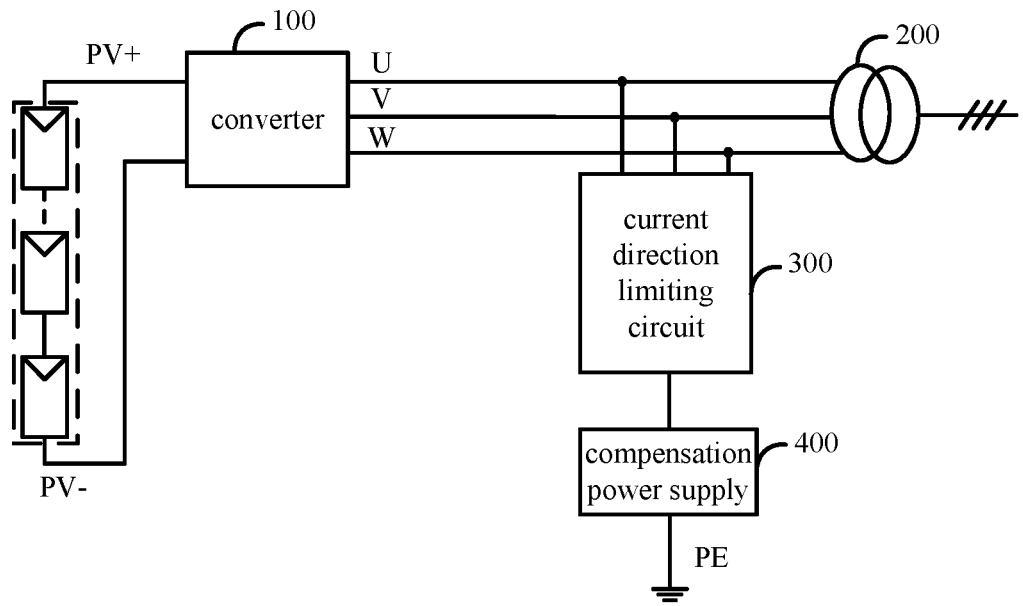
FIG. 1 is a schematic diagram of a voltage compensation apparatus for a three-phase photovoltaic system according to the present disclosure.

FIG. 1 is a schematic diagram of a voltage compensation apparatus for a three-phase photovoltaic system according to the present disclosure.

The present embodiment provides a voltage compensation apparatus which is applied to a photovoltaic system. The photovoltaic system includes: a photovoltaic array PV, a converter 100 and a transformer 200. An output terminal of the converter 100 is connected with a primary side of the transformer 200, and an input terminal of the converter 100 is connected with the photovoltaic array.

The voltage compensation apparatus includes: a current direction limiting circuit 300 and a compensation power supply 400 connected in series. Alternatively, the voltage compensation apparatus includes only a current direction limiting circuit 300.

Understandably, in a case that the voltage compensation apparatus includes the current direction limiting circuit 300 and the compensating power supply 400, a potential of a preset voltage, which is provided by the compensation power supply 400, exists between the output terminal of the converter 100 and the ground.

The current direction limiting circuit 300 includes at least one limiting device configured to conduct a current in a unidirectional manner.

The voltage compensation apparatus is connected between the output terminal of the converter 100 and the ground PE.

Figure 2:
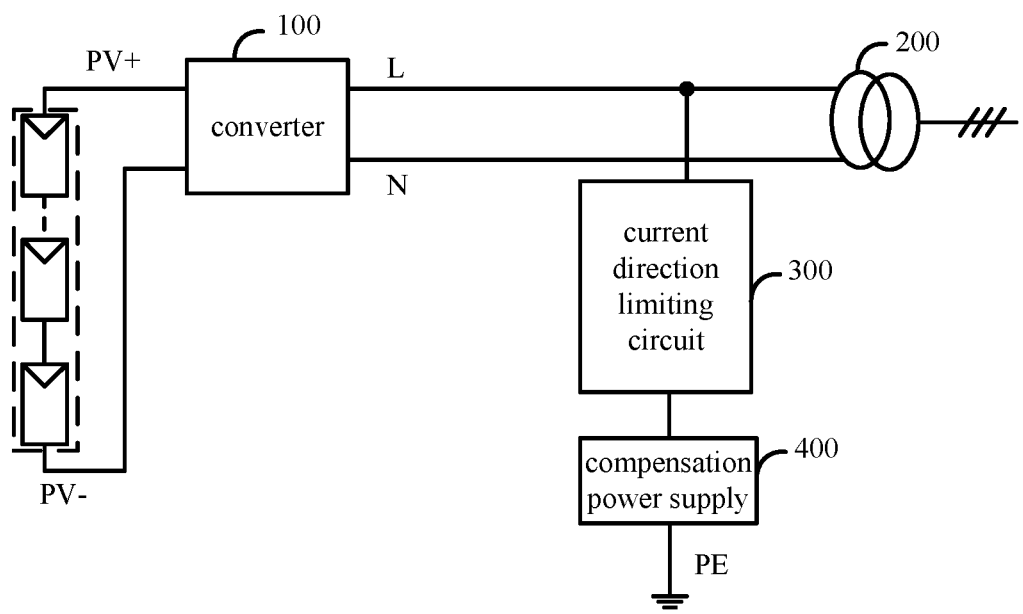
FIG. 2 is a schematic diagram of a voltage compensation apparatus for a single-phase photovoltaic system according to the present disclosure.

It should be noted that the photovoltaic system is a three-phase system in FIG. 1. The technical solution according to the present embodiment may further be applied to a single-phase photovoltaic system as shown in FIG. 2.

As shown in FIG. 1, the photovoltaic system includes one converter, and understandably, the photovoltaic system may also include multiple converters having output terminals connected in parallel. The input terminal of each of the converters is connected with an independent photovoltaic array.

The photovoltaic array includes multiple photovoltaic panel strings connected in series-parallel.

In the three-phase photovoltaic system as shown in FIG. 1, the voltage compensation apparatus is connected with at least one phase, that is, the voltage compensation apparatus may be connected with one phase, or two phases, or three phases. In FIG. 1, the voltage compensation apparatus is connected with one phase.

With the voltage compensation apparatus for the photovoltaic system according to the present disclosure, the output terminal of the converter is connected with the compensation power supply through a limiting device which conducts a current in a unidirectional manner. The limiting device only allows the current in the allowed direction, and do not allow current in the opposite direction. Thus with the limiting device, the lowest or highest value of the output voltage of the converter can be clamped to the voltage of the compensation power supply or be clamped to the ground. The clamping function of the limiting device which conducts a current in a unidirectional manner is utilized effectively in the present disclosure, so as to raise or lower the output voltage of the converter to compensate the voltage of the photovoltaic system relative to the ground, which can prevent the PID effect.

Moreover, the voltage compensation apparatus according to the present disclosure has no requirement for the transformer structure of the photovoltaic system. The transformer may be a transformer with or without a center tap.

The following embodiments are described with an example that the voltage compensation apparatus includes a current direction limiting circuit 300 and a compensation power supply 400 connected in series. The voltage compensation apparatus includes one current direction limiting circuit and one compensation power supply connected in series in a case that the photovoltaic system is a single-phase system.

At least one phase is connected with the voltage compensation apparatus in a case that the photovoltaic system is a three-phase system.

The voltage compensation apparatus includes one current direction limiting circuit and one compensation power supply connected in series, in a case that one phase is connected with the voltage compensation apparatus.

The voltage compensation apparatus includes two current direction limiting circuits and one compensation power supply shared by the two current direction limiting circuits or includes two current direction limiting circuits and two corresponding compensation power supplies, in a case that two phases are connected with the voltage compensation apparatus.

Understandably, power supplies can be saved in the case that one compensation power supply is shared.

The voltage compensation apparatus includes three current direction limiting circuits and one compensation power supply shared by the three current direction limiting circuits, or includes three current direction limiting circuits and three compensation power supplies in a case that three phases are connected with the voltage compensation apparatus.

Second Embodiment

Hereinafter a three-phase photovoltaic system is taken as an example for illustration. Understandably, the case of the voltage compensation apparatus in a single-phase photovoltaic system is the same as the case of the voltage compensation apparatus connected with only one phase of a three-phase photovoltaic system, and therefore the case of the single-phase photovoltaic system is not described separately herein.

It should be noted that the current direction limiting circuit is any one of a diode, a body diode of a Metallic Oxide Semiconductor Field Effect Transistor (MOSFET), an anti-parallel diode of an Insulated Gate Bipolar Transistor (IGBT), a thyristor and a zener diode.

Hereinafter a case that the current direction limiting circuit is a diode is taken as an example for illustration. Understandably, the diode has a unidirectional conducting characteristic.

Figure 3:
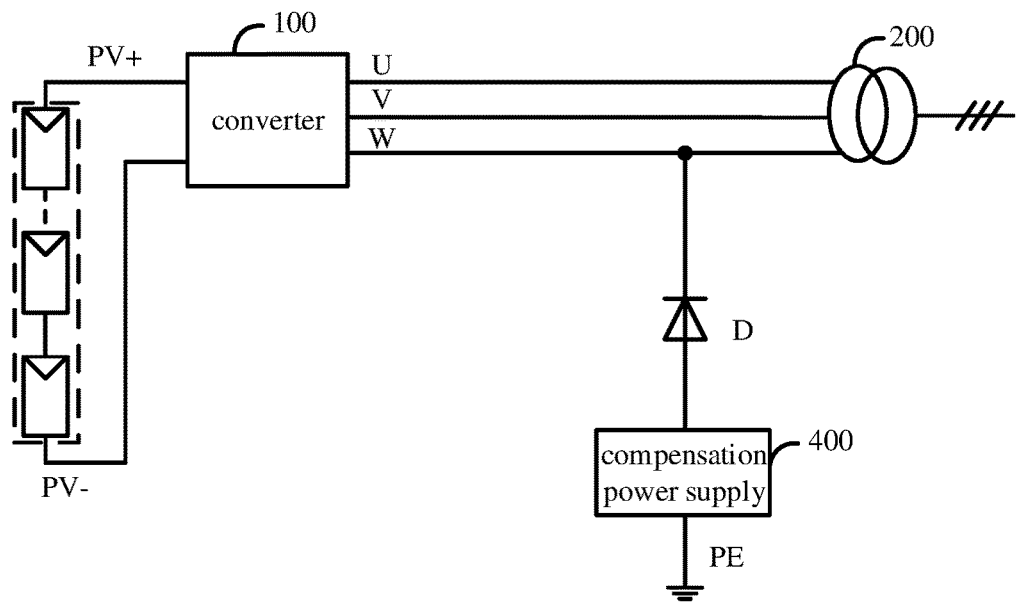
FIG. 3 is a schematic diagram of a voltage compensation apparatus according to a second embodiment of the present disclosure.

FIG. 3 is a schematic diagram of a voltage compensation apparatus according to the second embodiment of the present disclosure.

As shown in FIG. 3, the voltage compensation apparatus is applied to a three-phase photovoltaic system, and only one phase in the three-phase photovoltaic system is connected with the voltage compensation apparatus.

As can be seen, a cathode of the diode D is connected with a W-phase power line and an anode of the diode D is grounded through the compensation power supply 400. By a clamping function of the diode, a minimum W-phase output voltage of the converter is not less than the output voltage of the compensation power supply 400, thus realizing the function of changing the voltage of the entire photovoltaic system relative to the ground. As a typical application, this embodiment is suitable for situations of raising the voltage of the photovoltaic system relative to the ground. The output voltage of compensation power supply is positive. The voltage of the photovoltaic system relative to the ground is raised by a magnitude of (an output voltage of the compensation power supply + a peak phase voltage of the alternating current) because of the clamping function of the diode.

Figure 4:
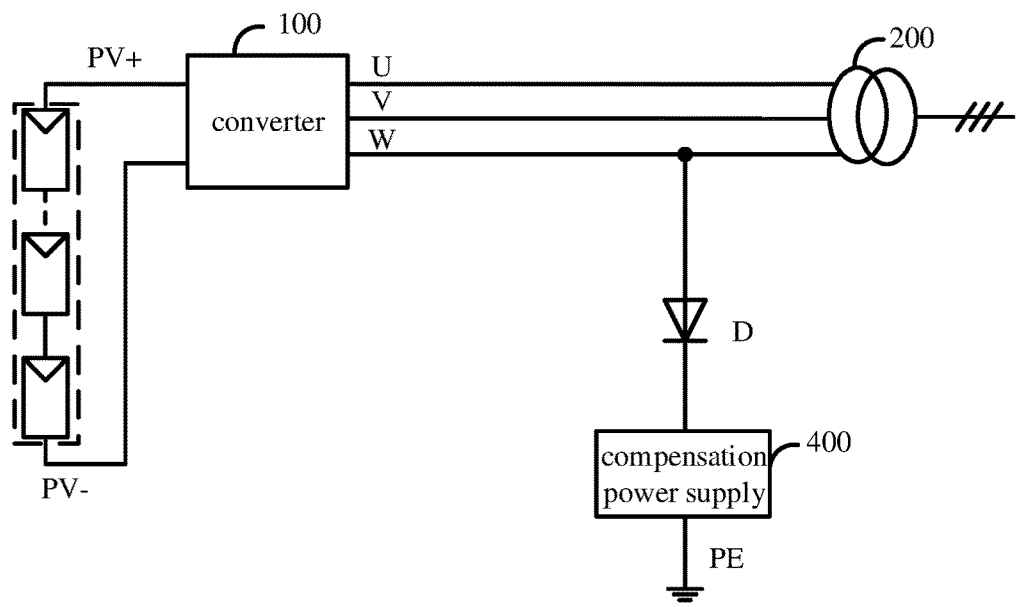
FIG. 4 is another schematic diagram of the voltage compensation apparatus according to the second embodiment of the present disclosure.

Correspondingly, as shown in FIG. 4, the anode of the diode is connected with the W-phase power line and the cathode of the diode D is grounded through the compensation power supply 400. With the clamping function of the diode, a maximum W-phase output voltage of the converter is not greater than the output voltage of the compensation power supply 400, thus realizing the function of changing the voltage of the entire photovoltaic system relative to the ground. As a typical application, this embodiment is suitable for situations of lowering the voltage of the photovoltaic system relative to the ground. The output voltage of compensation power supply is negative. The voltage of the photovoltaic system relative to the ground is lowered by a magnitude of (an output voltage of the compensation power supply − a peak phase voltage of the alternating current) because of the clamping function of the diode.

Third Embodiment

Figure 5:
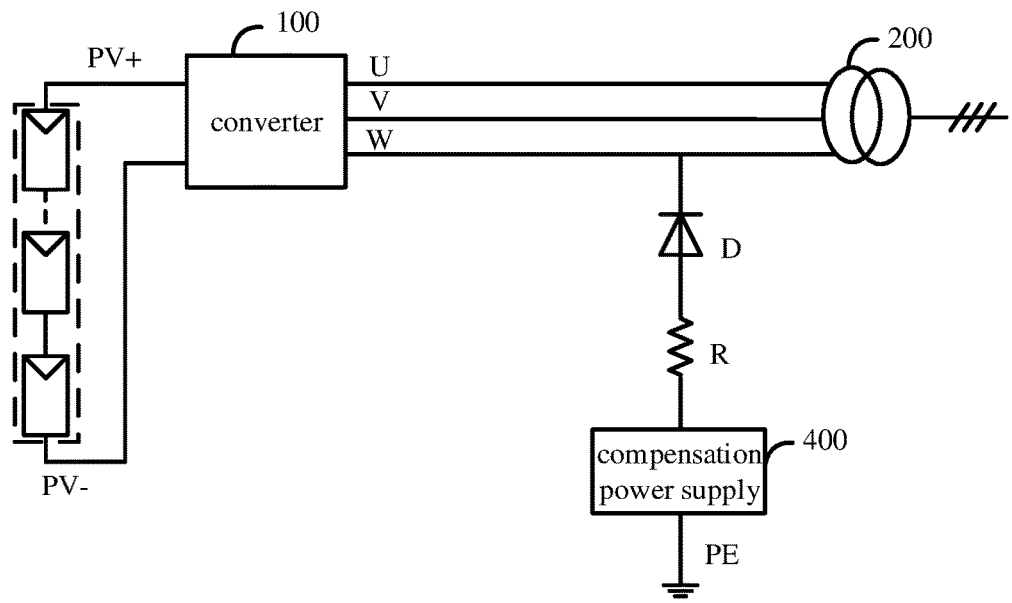
FIG. 5 is a schematic diagram of a voltage compensation apparatus according to a third embodiment of the present disclosure.

FIG. 5 is a schematic diagram of a voltage compensation apparatus according to a third embodiment of the present disclosure.

The voltage compensation apparatus according to the present embodiment further includes: a current limiting circuit connected in series with the current direction limiting circuit.

The current direction limiting circuit includes at least one of a resistor and an inductor.

Understandably, the current limiting circuit may be only a resistor, or only an inductor, or a resistor and an inductor connected in series, or a resistor and an inductor connected in parallel, or resistors and an inductors connected in series-parallel.

In this embodiment, the provided current limiting circuit may suppress the leakage current of the photovoltaic system through the voltage compensation apparatus, and may also suppress transient overcurrent in a case that the voltage compensation apparatus is just connected into the photovoltaic system, or prevent excessive output current of the compensation power supply in a case that the impedance of the photovoltaic system relative to the ground is too low.

In addition, the voltage compensation apparatus according to the embodiment of the present disclosure may further include a switch or a fuse. The switch or fuse is configured to perform protection in a case of an accident. The switch or fuse is connected in series with the diode and the compensation power supply.

For example, the fuse can be blown in a case of overcurrent, thus playing a protective role in time. The switch is configured to be tripped in a case that the current is large, or to break the voltage compensation apparatus from the photovoltaic system before the voltage compensation apparatus is powered on.

As shown in FIG. 5, in a case that the current limiting circuit is a resistor R, the cathode of the diode D is connected with the W-phase power line and the anode of the diode D is grounded through the resistor R and the compensation power supply 400 which are connected in series.

Fourth Embodiment

Figure 6:
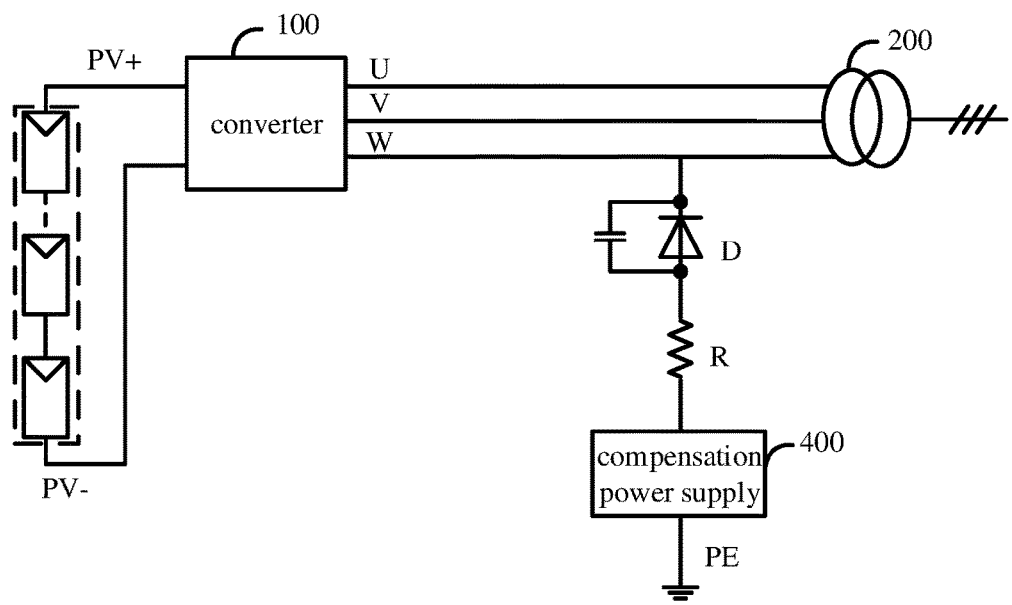
FIG. 6 is a schematic diagram of a voltage compensation apparatus according to a fourth embodiment of the present disclosure.

FIG. 6 is a schematic diagram of a voltage compensation apparatus for a photovoltaic system according to a fourth embodiment of the present disclosure;

The voltage compensation apparatus for the photovoltaic system according to the present embodiment further includes a voltage stabilizing circuit, which is configured to improve the stability of the voltage compensated for the photovoltaic system.

The voltage stabilizing circuit is connected in parallel with the current direction limiting circuit.

Alternatively, the voltage stabilizing circuit is connected in parallel with the series branch of the current direction limiting circuit and the compensation power supply.

The voltage stabilizing circuit includes a capacitor.

It should be noted that the number of the capacitors may be the same as or different from the number of the limiting devices configured to conduct a current in a unidirectional manner.

As shown in FIG. 6, description is given by way of an example that the current direction limiting circuit is a diode and the voltage stabilizing circuit is a capacitor. A capacitor C is connected in parallel with a diode D (i.e. in parallel with the current direction limiting circuit).

Figure 7:
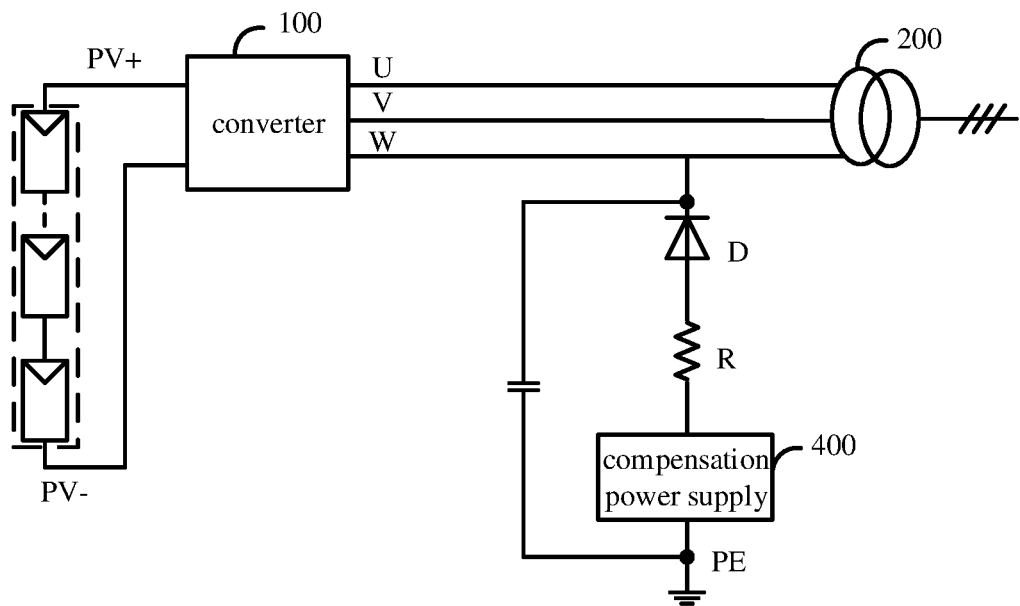
FIG. 7 is another schematic diagram of the voltage compensation apparatus according to the fourth embodiment of the present disclosure.

In addition, as another implementation as shown in FIG. 7, the capacitor C is connected in parallel with the entire the voltage compensation apparatus, that is, the capacitor C is connected in parallel with the series branch of the diode D and the compensation power supply 400.

It should be noted that, the capacitor C provided to the voltage compensation apparatus of the present disclosure may reduce a ripple of voltage of the photovoltaic system relative to the ground. However, if the capacitance Y of the photovoltaic system itself relative to the ground is sufficient, the capacitor C in FIG. 6 may be omitted.

Understandably, this capacitor C may also be replaced by the capacitor (commonly referred as the Y-capacitor) of the photovoltaic system to the ground.

FIGS. 3 to 7 all illustrate a three-phase photovoltaic system having one phase connected with the voltage compensation apparatus. The implementation of three phases connected with the voltage compensation apparatus is described hereinafter.

Fifth Embodiment

Figure 8:
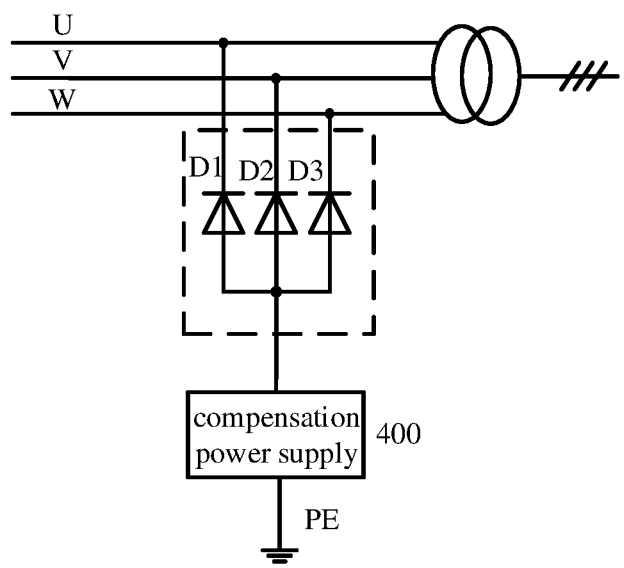
FIG. 8 is a first schematic diagram of a voltage compensation apparatus according to a fifth embodiment of the present disclosure.

FIG. 8 is a schematic diagram of a voltage compensation apparatus according to a fifth embodiment of the present disclosure.

As shown in FIG. 8, a cathode of the diode is connected with a phase power line, and an anode of the diode is grounded through the compensation power supply 400. That is, D1 is connected with the U-phase power line, D2 is connected with the V-phase power line and D3 is connected with the W-phase power line. FIG. 8 shows a situation in which the output voltage of the converter in the photovoltaic system relative to the ground is raised.

Figure 9:
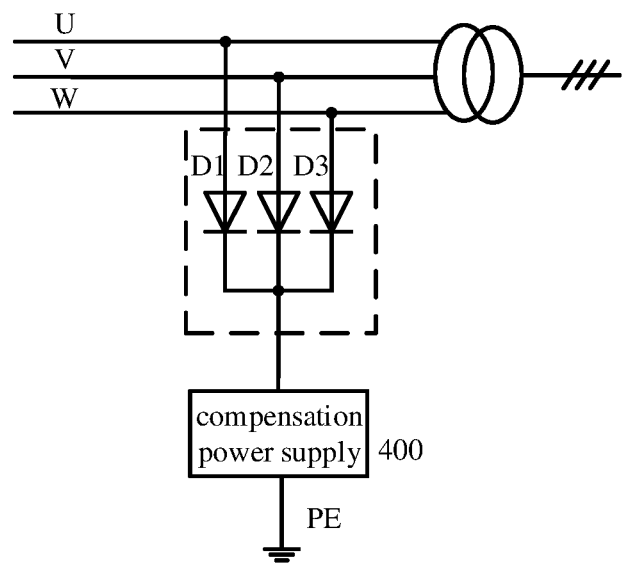
FIG. 9 is a second schematic diagram of the voltage compensation apparatus according to the fifth embodiment of the present disclosure.

Similarly, as shown in FIG. 9, an anode of the diode is connected with a phase power line, and a cathode of the diode is grounded through the compensation power supply 400. FIG. 9 shows a situation in which the output voltage of the converter in the photovoltaic system relative to the ground is lowered.

Figure 10:
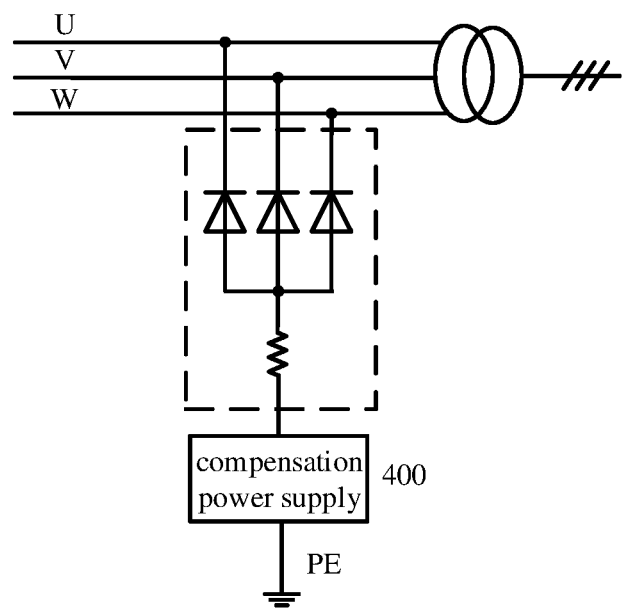
FIG. 10 is a third schematic diagram of the voltage compensation apparatus according to the fifth embodiment of the present disclosure.
Figure 11:
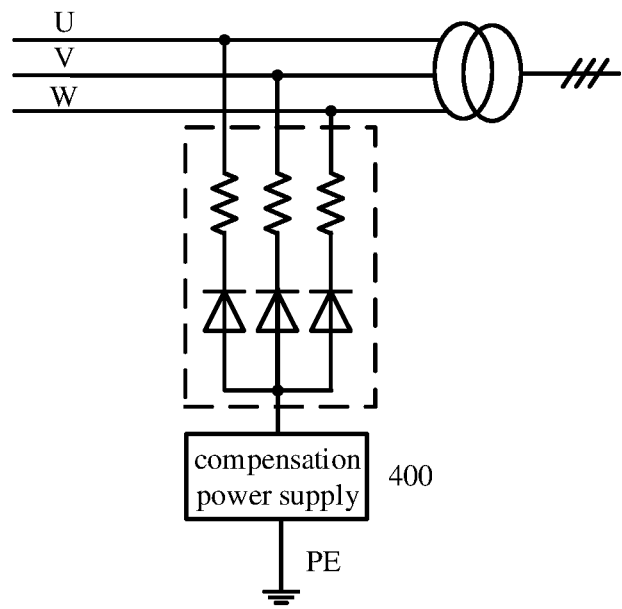
FIG. 11 is a fourth schematic diagram of the voltage compensation apparatus according to the fifth embodiment of the present disclosure.

In addition, referring to FIG. 10 which is similar to FIG. 5, in the case that three phases are connected with the voltage compensation apparatus, three diodes may correspond to the same resistor R and the resistor R realizes the current limiting function. Similarly, three diodes also correspond to the same compensation power supply. Understandably, each of the three diodes may be connected with one resistor respectively in series as shown in FIG. 11, while the three diodes in FIG. 11 correspond to the same compensation power supply. Understandably, each of the three diodes may be connected in series with one compensating power supply respectively. It should be noted that in order to better raise the voltage, the voltages of the compensation power supplies connected in series with the three diodes respectively are preferably equal to each other.

Figure 12:
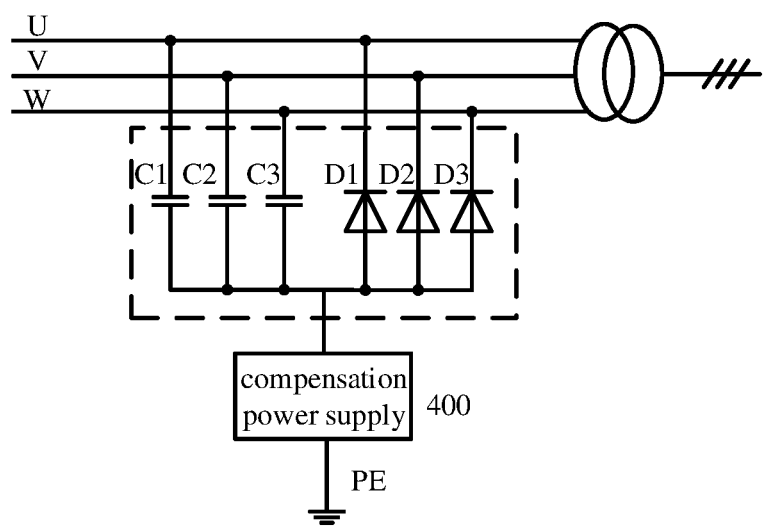
FIG. 12 is a fifth schematic diagram of the voltage compensation apparatus according to the fifth embodiment of the present disclosure.
Figure 13:
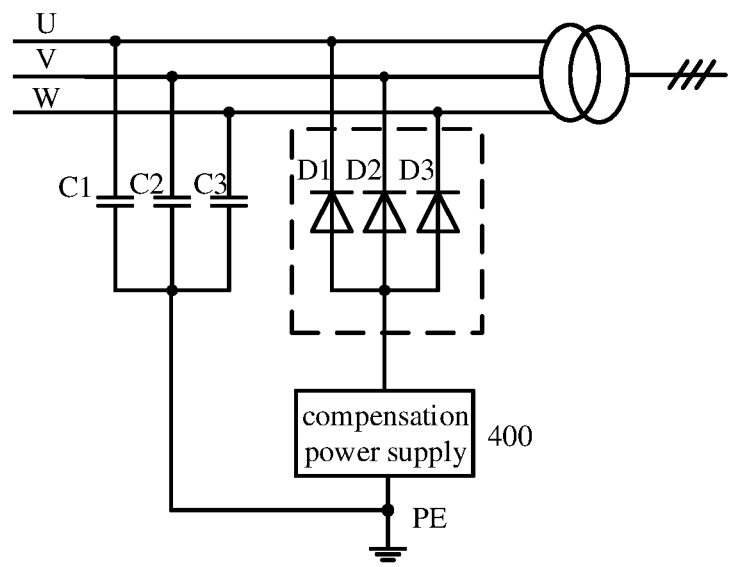
FIG. 13 is a sixth schematic diagram of the voltage compensation apparatus according to the fifth embodiment of the present disclosure.

In addition, in FIG. 12 with reference to FIG. 6, one capacitor (the voltage stabilizing circuit) is connected in parallel with each diode (the current direction limiting circuit) corresponding to a phase. Referring to FIG. 13 with reference to FIG. 7, one terminal of the capacitor is connected with a phase power line, the other terminal of the capacitor is grounded (the diode and the compensation power supply are connected in series and then are connected in parallel with the capacitor).

Sixth Embodiment

Figure 14:
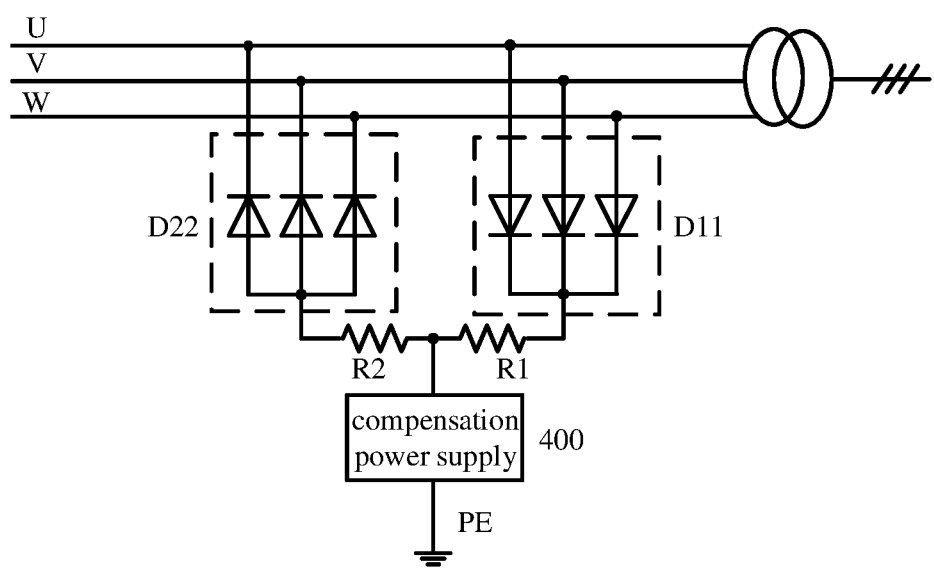
FIG. 14 is a schematic diagram of a voltage compensation apparatus according to a sixth embodiment of the present disclosure.

FIG. 14 is a schematic diagram of a voltage compensation apparatus for a photovoltaic system according to a sixth embodiment of the present disclosure.

The above embodiment includes only one set of current direction limiting circuits, while in the present embodiment two sets of current direction limiting circuits are provided, so as to extend the adjustable voltage range.

As shown in FIG. 14, in a case that the photovoltaic system is a three-phase system having three phases connected with two voltage compensation apparatuses: a first voltage compensation apparatus including a first set of current direction limiting circuits D11 and a second voltage compensation apparatus including a second set of current direction limiting circuits D22.

The first set of current direction limiting circuits D11 includes three first diodes. Each of the first diodes has an anode connected with a corresponding phase power line, and a cathode connected with the compensation power supply 400.

The second set of current direction limiting circuits D22 includes three second diodes. Each of the second diode has a cathode connected with a corresponding phase power line, and an anode connected with the compensation power supply.

In a case that the current limiting circuit is in a form of resistor, the current limiting circuit includes a first current limiting resistor R1 and a second current limiting resistor R2.

The first set of current direction limiting circuits D11 is connected with the compensation power supply through the first current limiting resistor R1.

The second set of current direction limiting circuits D22 is connected with the compensation power supply through the second current limiting resistor R2.

D22 is configured for a situation of raising the voltage, and D11 is configured for a situation of lowering the voltage. The combination of the two may be configured for a selectable situation of raising or lowering the voltage. D11 and D22 are also connected with current limiting circuits, i.e. resistors, as shown in FIG. 14. The ratio of resistances of the two resistors R1 and R2 may be adjusted to raise or lower the voltage relative to the ground.

In addition, if D11 and D22 are also connected with a switch in series, the switch corresponding to the photovoltaic panel actually used in the photovoltaic system may be controlled to be on while the other switch is controlled to be off, so as to select raising or lowering the voltage of the photovoltaic system to ground.

It should be noted that the set of diodes are all connected in series with the same resistor in FIG. 14. In addition, each diode may be connected in series with a resistor respectively, that is, the first set of current direction limiting circuit corresponds to three resistors and the second set of current direction limiting circuit corresponds to three resistors, which is not specifically illustrated herein.

It should be noted that R1 and R2 are necessary in the case as shown in FIG. 14, otherwise the three-phase grid will be short-circuited through the diodes in the D11 and D22.

Seventh Embodiment

Figure 15A:
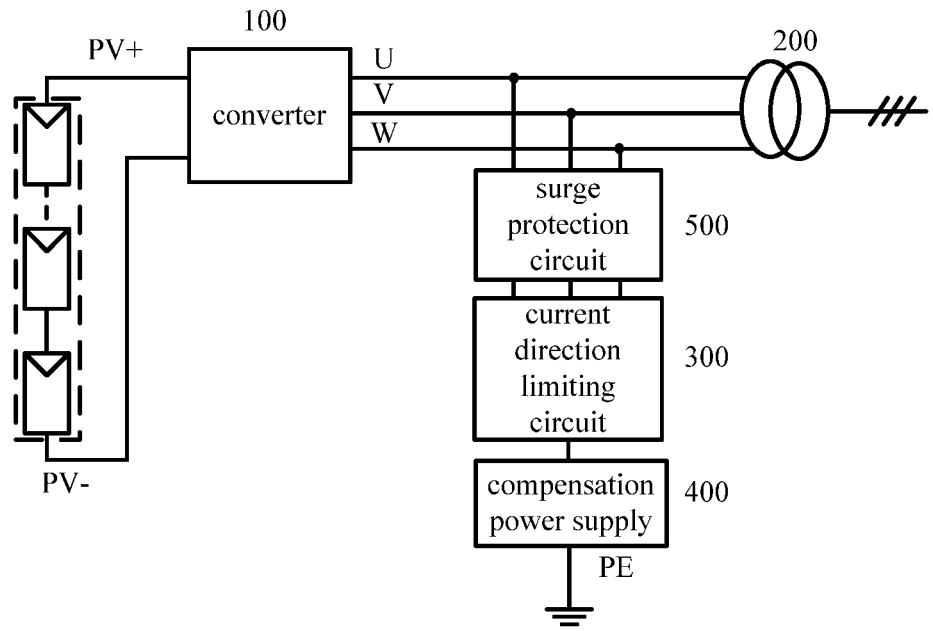
FIG. 15A is a schematic diagram of a voltage compensation apparatus according to a seventh embodiment of the present disclosure.
Figure 15B:
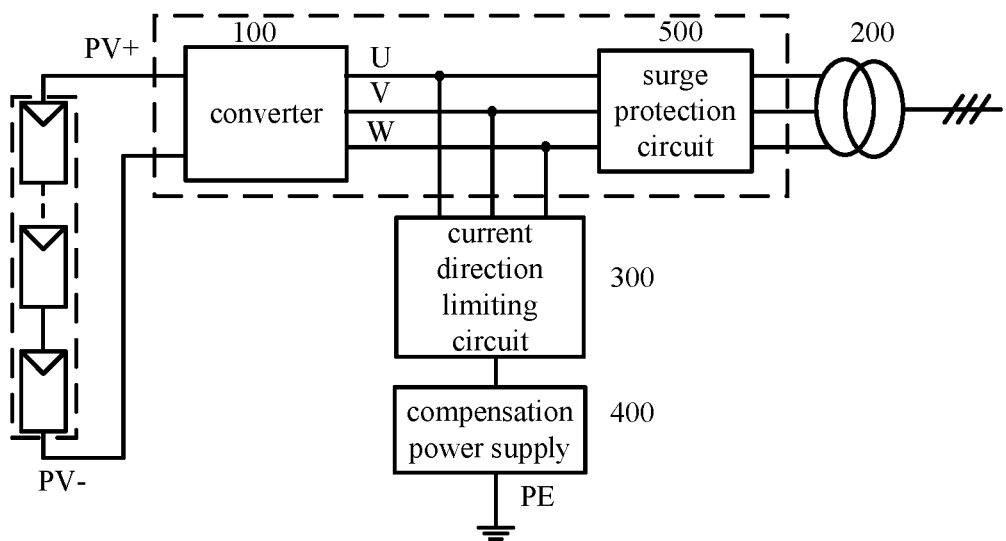
FIG. 15B is another schematic diagram of the voltage compensation apparatus according to the seventh embodiment of the present disclosure.

FIGS. 15a and 15b are schematic diagrams of a voltage compensation apparatus for a photovoltaic system according to a seventh embodiment of the present disclosure.

The voltage compensation apparatus according to the present embodiment further includes a surge protection circuit 500. As the voltage compensation apparatus is close to the grid, considering the surge impact of power grid side, the surge protection circuit is arranged.

The surge protection circuit 500 is connected in series with the current direction limiting circuit 300 as shown in FIG. 15A.

Alternatively, the surge protection circuit 500 is connected between an output terminal of the converter 100 and an input terminal of the transformer 200, as shown in FIG. 15B. In this case the surge protection circuit may be replaced by a surge protection circuit of the converter.

Understandably, the internal structure of the surge protection circuit may be embodied as any circuit having a surge protection function in the conventional art.

It should be noted that the voltage compensation apparatus according to the present disclosure may only include a current direction limiting circuit and a compensation power supply. Other circuits, such as the current limiting circuit, the voltage stabilizing circuit, the surge protection circuit, or the like, may be selected and added as required.

Eighth Embodiment

Figure 16:
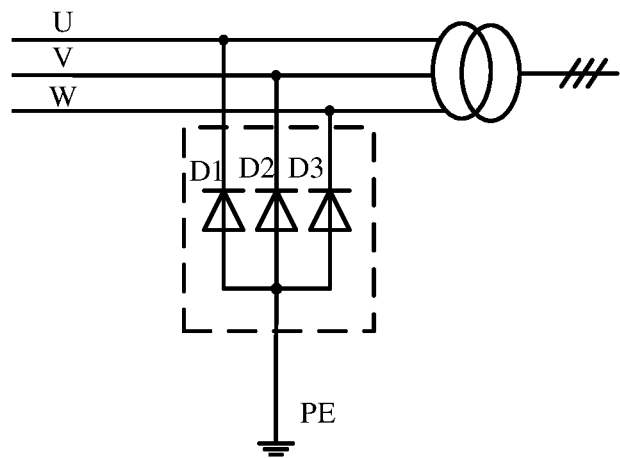
FIG. 16 is a schematic diagram of an eighth embodiment of a voltage compensation apparatus according to the present disclosure.

FIG. 16 is a schematic diagram of a voltage compensation apparatus for a photovoltaic system according to the eighth embodiment of the present disclosure.

The voltage compensation apparatus according to this embodiment only includes a current direction limiting circuit. The output terminal of the converter is directly grounded through the current direction limiting circuit, that is, no compensation power supply is included. This voltage compensation apparatus which does not include a compensation power supply is suitable for photovoltaic systems with a relatively low power.

Understandably, the current limiting circuit and the voltage stabilizing circuit in the above embodiment are also applicable to the case in which the compensation power supply is not included as shown in FIG. 16, which is not described in detail herein.

In addition, FIG. 16 corresponds to a situation of raising the voltage of the photovoltaic system relative to ground.

Embodiment for System

Figure 17:
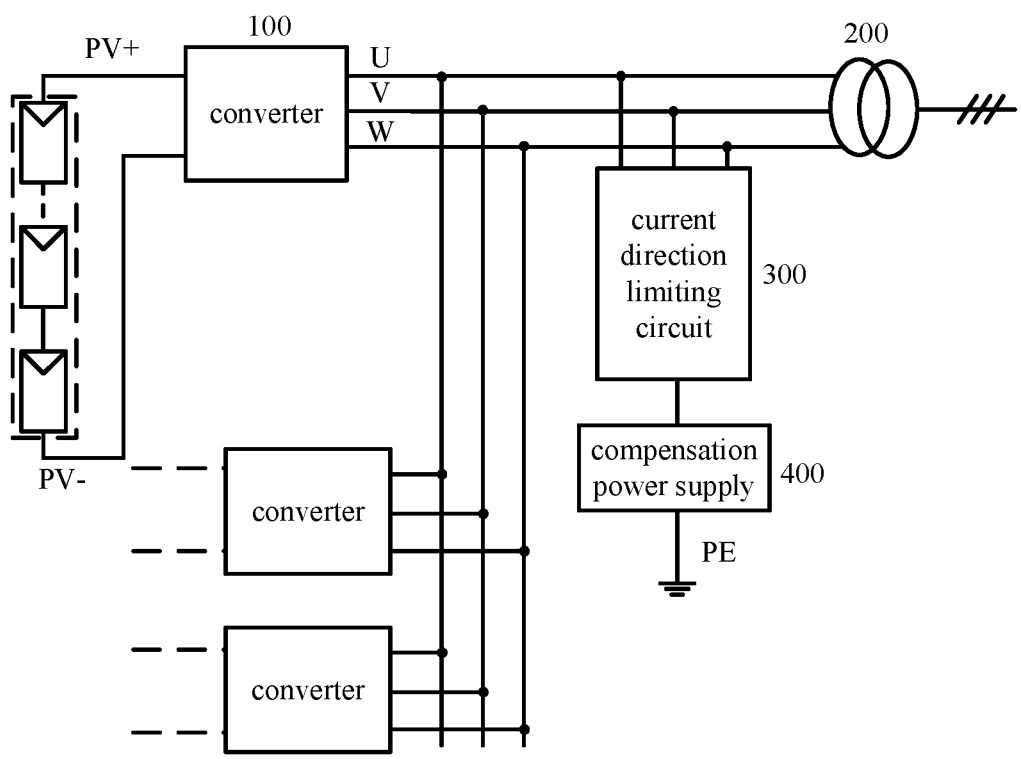
FIG. 17 is a schematic diagram of a photovoltaic system according to an embodiment of the present disclosure.

FIG. 17 is a schematic diagram of a photovoltaic system according to an embodiment of the present disclosure.

The photovoltaic system according to the present embodiment includes: a photovoltaic array PV, a converter 100, a transformer 200 and the voltage compensation apparatus.

An output terminal of the converter is connected with a primary side of the transformer, and an input terminal of the converter is connected with the photovoltaic array.

The voltage compensation apparatus is configured to raise or lower a voltage at the output terminal of the converter.

As shown in FIG. 17, the voltage compensation apparatus includes a current direction limiting apparatus 300 and a compensation power supply 400 connected in series.

Understandably, the voltage compensation apparatus may also only include the current direction limiting apparatus 300 without the compensation power supply 400.

It should be noted that all the implementations of the voltage compensation apparatus in the above embodiments may be applied to the photovoltaic system, which will not be described in detail herein.

In addition, as shown in FIG. 17, the photovoltaic system is a photovoltaic system in which the output terminals of multiple converters are connected in parallel and an input terminal of each of the converters is connected with a separate photovoltaic array. The photovoltaic arrays for some converters are not shown in FIG. 17. Understandably, the photovoltaic system may also include only one converter.

The foregoing is only preferred embodiments of the present disclosure and is not intended to limit the scope of the invention in any way. While the technical solution has been described above with reference to preferred embodiments, it is not intended to be limited thereto. Those skilled in the art may, according to the disclosed method and technical content, make many variations and modifications to the technical solution or make equivalents to the technical solution without departing from the scope of the disclosure. Therefore any simple modification, equivalent or modification made to the above embodiments according to the technical essence without departing from the spirit of the technical solution falls within the protection scope of the technical solution.

The invention claimed is:

1. A voltage compensation apparatus for a photovoltaic system, applied to the photovoltaic system, wherein
the photovoltaic system comprises: a photovoltaic array, a converter and a transformer;
an output terminal of the converter is connected with a primary side of the transformer, an input terminal of the converter is connected with the photovoltaic array;
the voltage compensation apparatus comprises at least one current direction limiting circuit;
the current direction limiting circuit is configured to conduct a current in one direction; and
the voltage compensation apparatus is connected between at least one phase of the output terminal of the converter and a ground,
wherein the voltage compensation apparatus further comprises a compensation power supply connected in series with the current direction limiting circuit,
the voltage compensation apparatus comprises one current direction limiting circuit and one compensation power supply connected in series, in a case that the photovoltaic system is a single-phase system;
at least one phase is connected with the voltage compensation apparatus in a case that the photovoltaic system is a three-phase system;
the voltage compensation apparatus comprises one current direction limiting circuit and one compensation power supply connected in series, in a case that one phase is connected with the voltage compensation apparatus;
the voltage compensation apparatus comprises two current direction limiting circuits and one compensation power supply shared by the two current direction limiting circuits or comprises two current direction limiting circuits and two corresponding compensation power supplies, in a case that two phases are connected with the voltage compensation apparatus; and
the voltage compensation apparatus comprises three current direction limiting circuits and one compensation power supply shared by the three current direction limiting circuits or comprises three current direction limiting circuits and three compensation power supplies, in a case that three phases are connected with the voltage compensation apparatus.

2. The voltage compensation apparatus for the photovoltaic system according to claim 1, wherein
the voltage compensation apparatus further comprises a current limiting circuit connected in series with the current direction limiting circuit; and
the current direction limiting circuit comprises at least one of a resistor and an inductor.

3. The voltage compensation apparatus for the photovoltaic system according to claim 1, wherein the current direction limiting circuit is any one of a diode, a body diode of a Metallic Oxide Semiconductor Field Effect Transistor (MOSFET), an anti-parallel diode of an Insulated Gate Bipolar Transistor (IGBT), a thyristor and a zener diode.

4. The voltage compensation apparatus for the photovoltaic system according to claim 1, wherein the voltage compensation apparatus further comprises a voltage stabilizing circuit;
the voltage stabilizing circuit is connected in parallel with the current direction limiting circuit; or
the voltage stabilizing circuit is connected in parallel with the series branch of the current direction limiting circuit and the compensation power supply.

5. The voltage compensation apparatus for the photovoltaic system according to claim 4, wherein the voltage stabilizing circuit comprises a capacitor.

6. The voltage compensation apparatus for the photovoltaic system according to claim 5, wherein in a case that the current direction limiting circuit is a diode,
an anode of the diode is connected with a phase power line, and a cathode of the diode is connected with the compensation power supply; or
a cathode of the diode is connected with a phase power line, and an anode of the diode is connected with the compensation power supply.

7. The voltage compensation apparatus for the photovoltaic system according to claim 2, wherein in a case that the photovoltaic system is a three-phase system having three phases connected with two voltage compensation apparatuses: a first voltage compensation apparatus comprising a first set of current direction limiting circuits and a second voltage compensation apparatus comprising a second set of current direction limiting circuits,
the first set of current direction limiting circuits comprises three first diodes, each of the first diodes has an anode connected with a corresponding phase power lines, and a cathode connected with the compensation power supply; and
the second set of current direction limiting circuits comprises three second diodes, each of the second diode has a cathode connected with a corresponding phase power line, and an anode connected with the compensation power supply.

8. The voltage compensation apparatus for the photovoltaic system according to claim 7, wherein in a case that the current limiting circuit is in a form of resistor, the current limiting circuit comprises a first current limiting resistor and a second current limiting resistor;
- the first set of current direction limiting circuits is connected with the compensation power supply through the first current limiting resistor; and
- the second set of current direction limiting circuits is connected with the compensation power supply through the second current limiting resistor.

9. The voltage compensation apparatus for the photovoltaic system according to claim 1, wherein the voltage compensation apparatus further comprises a surge protection circuit;
- the surge protection circuit is connected in series with the current direction limiting circuit; or
- the surge protection circuit is connected between the output terminal of the converter and an input terminal of the transformer.

10. A photovoltaic system, comprising:
- a photovoltaic array,
- a converter,
- a transformer, and
- a voltage compensation apparatus, wherein
- an output terminal of the converter is connected with a primary side of the transformer, an input terminal of the converter is connected with the photovoltaic array;
- the voltage compensation apparatus is configured to raise or lower a voltage at the output terminal of the converter;
- the voltage compensation apparatus comprises at least one current direction limiting circuit;
- the current direction limiting circuit is configured to conduct a current in one direction; and
- the voltage compensation apparatus is connected between at least one phase of the output terminal of the converter and a ground;
- wherein the voltage compensation apparatus further comprises a compensation power supply connected in series with the current direction limiting circuit,
- the voltage compensation apparatus comprises one current direction limiting circuit and one compensation power supply connected in series, in a case that the photovoltaic system is a single-phase system;
- at least one phase is connected with the voltage compensation apparatus in a case that the photovoltaic system is a three-phase system;
- the voltage compensation apparatus comprises one current direction limiting circuit and one compensation power supply connected in series, in a case that one phase is connected with the voltage compensation apparatus;
- the voltage compensation apparatus comprises two current direction limiting circuits and one compensation power supply shared by the two current direction limiting circuits or comprises two current direction limiting circuits and two corresponding compensation power supplies, in a case that two phases are connected with the voltage compensation apparatus; and
- the voltage compensation apparatus comprises three current direction limiting circuits and one compensation power supply shared by the three current direction limiting circuits or comprises three current direction limiting circuits and three compensation power supplies, in a case that three phases are connected with the voltage compensation apparatus.

11. The photovoltaic system according to claim 10, wherein
- the voltage compensation apparatus further comprises a current limiting circuit connected in series with the current direction limiting circuit; and
- the current direction limiting circuit comprises at least one of a resistor and an inductor.

12. The photovoltaic system according to claim 10, wherein the current direction limiting circuit is any one of a diode, a body diode of a Metallic Oxide Semiconductor Field Effect Transistor (MOSFET), an anti-parallel diode of an Insulated Gate Bipolar Transistor (IGBT), a thyristor and a zener diode.

13. The photovoltaic system according to claim 10, wherein the voltage compensation apparatus further comprises a voltage stabilizing circuit;
- the voltage stabilizing circuit is connected in parallel with the current direction limiting circuit; or
- the voltage stabilizing circuit is connected in parallel with the series branch of the current direction limiting circuit and the compensation power supply.

14. The photovoltaic system according to claim 13, wherein the voltage stabilizing circuit comprises a capacitor.

15. The photovoltaic system according to claim 14, wherein in a case that the current direction limiting circuit is a diode,
- an anode of the diode is connected with a phase power line, and a cathode of the diode is connected with the compensation power supply; or
- a cathode of the diode is connected with a phase power line, and an anode of the diode is connected with the compensation power supply.

16. The photovoltaic system according to claim 11, wherein in a case that the photovoltaic system is a three-phase system having three phases connected with two voltage compensation apparatuses: a first voltage compensation apparatus comprising a first set of current direction limiting circuits and a second voltage compensation apparatus comprising a second set of current direction limiting circuits,
- the first set of current direction limiting circuits comprises three first diodes, each of the first diodes has an anode connected with a corresponding phase power lines, and a cathode connected with the compensation power supply; and
- the second set of current direction limiting circuits comprises three second diodes, each of the second diode has a cathode connected with a corresponding phase power line, and an anode connected with the compensation power supply.

17. The photovoltaic system according to claim 16, wherein in a case that the current limiting circuit is in a form of resistor, the current limiting circuit comprises a first current limiting resistor and a second current limiting resistor;
- the first set of current direction limiting circuits is connected with the compensation power supply through the first current limiting resistor; and
- the second set of current direction limiting circuits is connected with the compensation power supply through the second current limiting resistor.

18. The photovoltaic system according to claim 10, wherein the voltage compensation apparatus further comprises a surge protection circuit;
- the surge protection circuit is connected in series with the current direction limiting circuit; or the surge protection circuit is connected between the output terminal of the converter and an input terminal of the transformer.

* * * * *